(12) United States Patent
Lambert

(10) Patent No.: US 10,175,481 B2
(45) Date of Patent: Jan. 8, 2019

(54) HEAD UP DISPLAY WITH TOTAL INTERNAL REFLECTION OPTICAL ELEMENT

(71) Applicant: PANASONIC AUTOMOTIVE SYSTEMS COMPANY OF AMERICA, DIVISION OF PANASONIC CORPORATION OF NORTH AMERICA, Peachtree City, GA (US)

(72) Inventor: David Kay Lambert, Sterling Heights, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/418,287

(22) Filed: Jan. 27, 2017

(65) Prior Publication Data
US 2017/0219821 A1 Aug. 3, 2017

Related U.S. Application Data

(60) Provisional application No. 62/288,630, filed on Jan. 29, 2016.

(51) Int. Cl.
*G02B 27/01* (2006.01)
*F21V 8/00* (2006.01)
*G02B 5/04* (2006.01)

(52) U.S. Cl.
CPC ........... *G02B 27/0101* (2013.01); *G02B 5/04* (2013.01); *G02B 6/0046* (2013.01); *G02B 2027/015* (2013.01)

(58) Field of Classification Search
CPC ..................................................... G02B 27/01
See application file for complete search history.

(56) References Cited

U.S. PATENT DOCUMENTS

| | | | |
|---|---|---|---|
| 2008/0002159 A1* | 1/2008 | Liu | G03B 21/00 353/84 |
| 2013/0188260 A1* | 7/2013 | Matsushita | B60K 35/00 359/632 |
| 2015/0102980 A1* | 4/2015 | Pasca | G02B 27/0101 345/7 |

* cited by examiner

*Primary Examiner* — Carl Adams
(74) *Attorney, Agent, or Firm* — Laurence S. Roach, Esq.

(57) ABSTRACT

A head up display arrangement for a motor vehicle includes a body that is at least partially transparent and that has a plurality of outer surfaces. An image source emits an illuminated image into a transparent portion of the body such that the illuminated image is internally reflected off the outer surfaces a plurality of times within the transparent portion of the body before leaving the body and then being reflected off of a windshield of the vehicle such that the illuminated image is visible to a driver of the vehicle.

15 Claims, 3 Drawing Sheets

HEAD UP DISPLAY WITH TOTAL INTERNAL REFLECTION OPTICAL ELEMENT

CROSS-REFERENCED TO RELATED APPLICATIONS

This application claims benefit of U.S. Provisional Application No. 62/288,630 filed on Jan. 29, 2016, which the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

It is difficult for vehicle manufacturers to package a conventional head up display in a vehicle because of the volume required, and because the space under the dashboard is needed for other essential systems. Vehicle manufacturers would like an even bigger virtual image than is used at the current time for "augmented reality" applications.

SUMMARY

The present invention may provide a head up display including a totally internally reflecting optical element that creates a light field that emulates the light field from a conventional head up display. Thus, the driver sees a virtual image in front of the vehicle, as with a conventional HUD.

The volume of an augmented reality (AR) HUD needs to be minimized. The volume of an AR-HUD may be greatly reduced through the use of "wedge optics." In essence, wedge optics involves focusing an image so the light goes into the base of a slab of plastic having planar faces that taper gradually together. The injected light is internally reflected inside the plastic by total internal reflection. Because of the wedge angle, after each reflection, the angle of incidence of the planar surface is increased. Eventually, the angle of incidence is large enough for the light to escape. The light that escapes appears to be the image that was focused into the base of the wedge, but expanded over a much larger area of the planar surface. The light also appears to be coming from a large distance away.

Wedge optics may be used to replace the mirrors in the HUD. Instead of having flat planar faces, the wedge may be designed so the light field that escapes is the same as the light field produced by a conventional HUD designed for the windshield of that vehicle. The depth of the HUD is replaced by a wedge of plastic. The total volume of the inventive HUD system is much lower than with a conventional HUD. The wedge may be manufactured like a HUD mirror.

In one embodiment, the invention comprises a head up display arrangement for a motor vehicle, including a body that is at least partially transparent and that has a plurality of outer surfaces. An image source emits an illuminated image into a transparent portion of the body such that the illuminated image is internally reflected off the outer surfaces a plurality of times within the transparent portion of the body before leaving the body and then being reflected off of a windshield of the vehicle such that the illuminated image is visible to a driver of the vehicle.

In another embodiment, the invention comprises a head up display method for a motor vehicle, including providing a body that is at least partially transparent and that has a plurality of outer surfaces. An illuminated image is emitted into a transparent portion of the body. The illuminated image is internally reflected off of the outer surfaces a plurality of times within the transparent portion of the body before the illuminated image leaves the body. The illuminated image is reflected off of a windshield of the vehicle after the illuminated image has left the body. The illuminated image is reflected off of the windshield such that the illuminated image is visible to a driver of the vehicle.

In yet another embodiment, the invention comprises a head up display arrangement for a motor vehicle, including a transparent wedge-shaped body having a base and two non-parallel internally reflective surfaces. Each of the reflective surfaces includes a respective first end and a respective second end opposite to the first end. Each of the reflective surfaces has a substantially equal length between the respective first end and the respective second end. The base interconnects the first ends of the reflective surfaces. The first ends are farther apart from each other than are the second ends. An image source emits an illuminated image into the base of the body such that the illuminated image is alternatingly reflected off the two internally reflective surfaces a plurality of times within the body before leaving the body. A windshield reflects the illuminated image after the illuminated image has left the body. The windshield reflects the illuminated image such that the illuminated image is visible to a driver of the vehicle.

An advantage of the present invention is that it may reduce the required HUD volume and increase flexibility to package the HUD in the vehicle with other vehicle systems.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
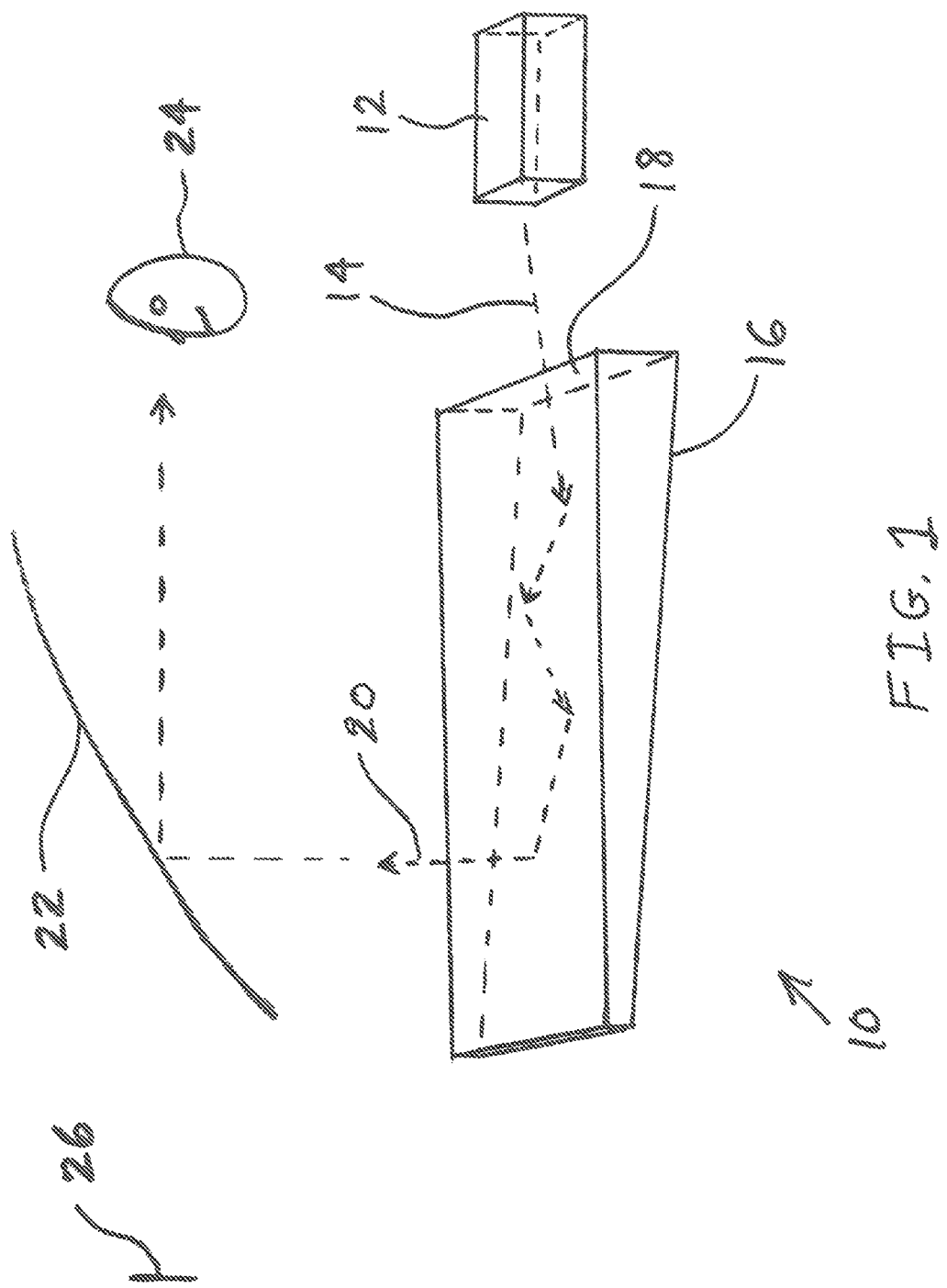
FIG. 1 is a perspective schematic view of one example embodiment of a HUD optical arrangement of the present invention.
Figure 2:
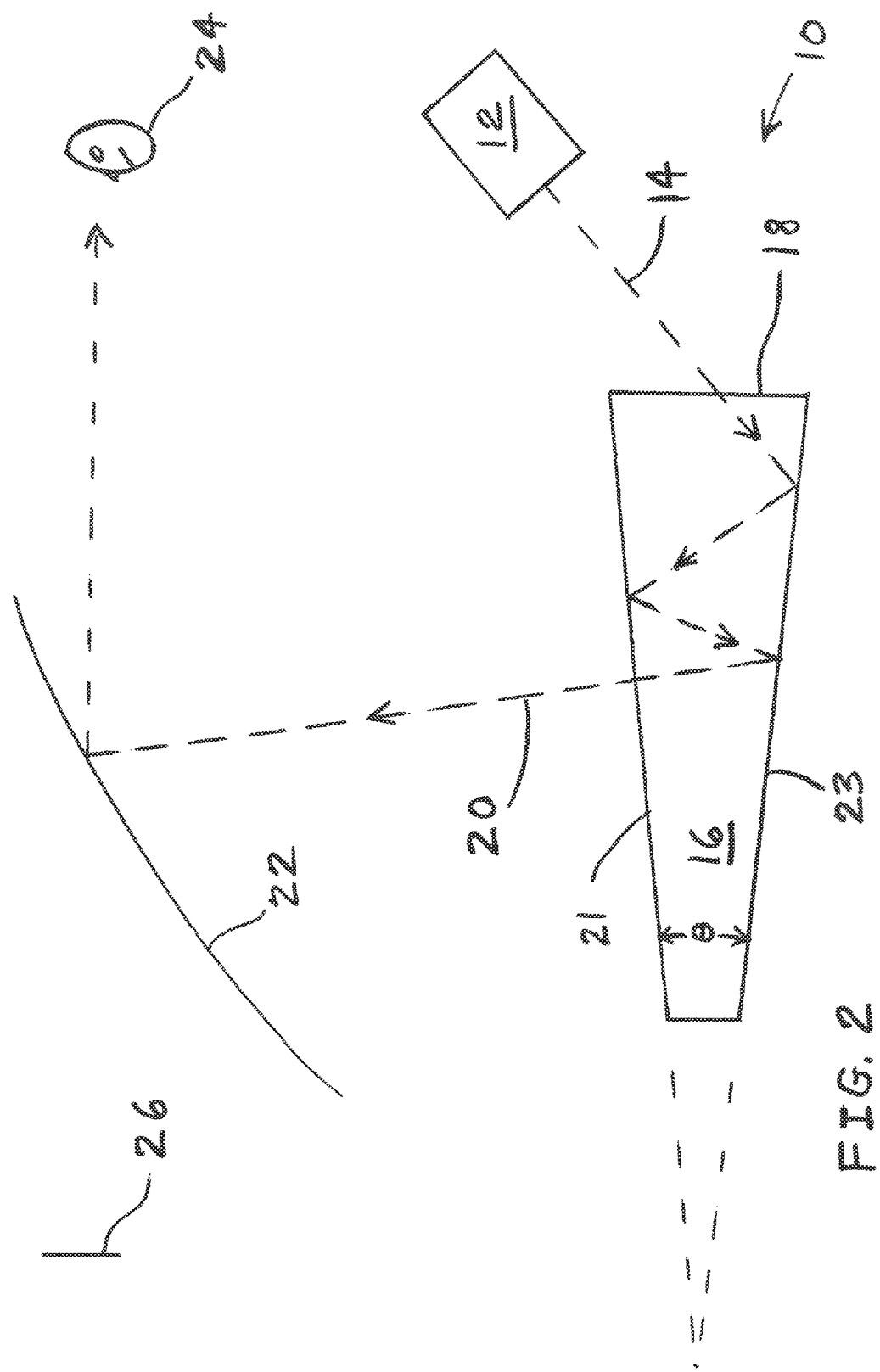
FIG. 2 is a front schematic view of the HUD optical arrangement of FIG. 1.

FIG. 1 illustrates in a one embodiment of a HUD optical arrangement 10 of the present invention, including a projector 12 projecting light rays 14 into a transparent plastic wedge 16. Light from projector 12 is directed into a base 18 of transparent plastic wedge 16. The light rays are internally reflected within wedge 16. The light reflects from opposite planar sides 21, 23 (FIG. 2) by total internal reflection. As a result of the wedge angle θ, the angle of incidence of the light increases with each reflection. Eventually, the angle of incidence is large enough for the light to escape when the total internal reflection angle is exceeded. If arranged suitably, the viewer sees a projected image that appears to come from far behind wedge 16. As best shown in FIG. 2, the distance between successive internal reflections may get progressively smaller as the two reflecting outer surfaces 21, 23 get closer together, thereby further limiting the distance the light travels before impinging on the next reflecting surface.

Wedge 16 may have planar faces, such as surfaces 21, 23. However, wedge 16 may also have surface shapes designed such that the projected light field 20 coming from the plastic body emulates the light field coming from a conventional HUD. If the same light field is produced by wedge 16 as by a conventional HUD, the virtual image seen by the driver is also the same. Consequently, the transparent plastic body 16 may replace the arrangement of reflective mirrors used in a conventional HUD. More particularly, the projected light field 20 may be reflected off of windshield 22 such that the light is visible to a driver 24 of the vehicle. The light may appear to the driver to be a virtual image 26 disposed outside windshield 22 and visible through windshield 22.

In one embodiment, optical design software (e.g., Zemax) is used to design the transparent plastic body 16 and the shapes of its external surfaces.

In one embodiment, arrangement 10 provides a virtual image measuring 10°×4° and that appears to be seven meters in front of the driver. The volume of the HUD system including arrangement 10 may be less than 8.4 liters.

In the present invention, the windshield may be used as a reflector, not as a total internally reflecting element. The total internally reflecting element in the form of wedge 16 performs a similar function to the mirrors in a conventional HUD, but occupies less volume and is easier to package.

Instead of using total internal reflection, as described above, outer surfaces of the wedge could be covered with a reflective coating.

There are many ways to configure the portion of the optical element that brings the light to the area where it exits to emulate a conventional HUD. Bends may be included in the wedge to meet packaging constraints.

Figure 3:
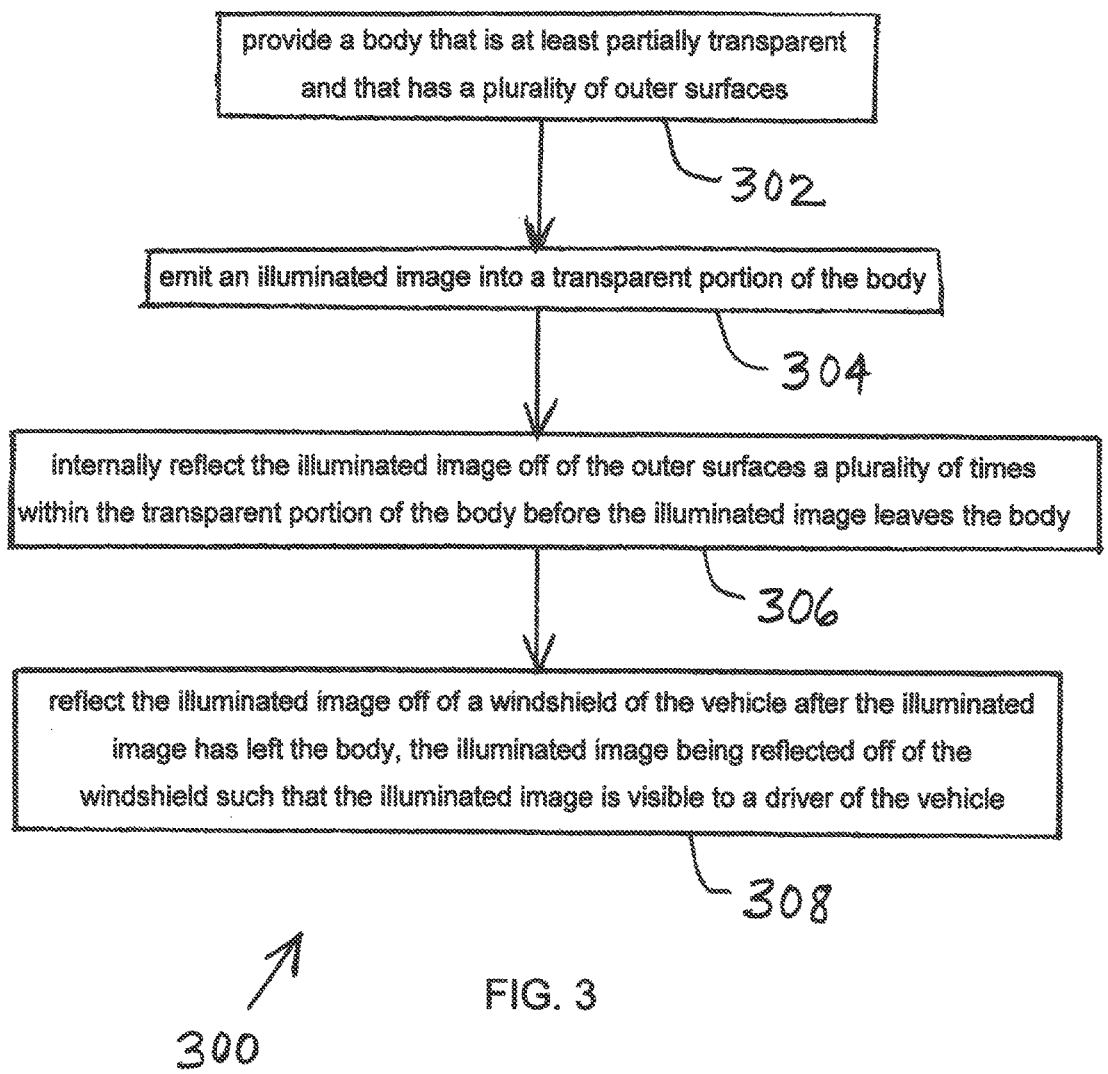
FIG. 3 is a flow chart of one example embodiment of a head up display method for a motor vehicle.

FIG. 3 illustrates one example embodiment of a head up display method 300 for a motor vehicle. In a first step 302, a body is provided that is at least partially transparent and that has a plurality of outer surfaces. For example, a transparent wedge 16 may be provided having outer surfaces 21, 23.

In a next step 304, an illuminated image is emitted into a transparent portion of the body. For example, a projector 12 may project an illuminated image in the form of light rays 14 into transparent wedge 16.

Next, in step 306, the illuminated image is internally reflected off of the outer surfaces a plurality of times within the transparent portion of the body before the illuminated image leaves the body. For example, light rays 14 are internally reflected within wedge 16 alternatingly off of outer surfaces 21, 23 before light rays 14 leave wedge 16 through surface 21 as a projected light field 20.

In a final step 308, the illuminated image is reflected off of a windshield of the vehicle after the illuminated image has left the body. The illuminated image is reflected off of the windshield such that the illuminated image is visible to a driver of the vehicle. For example, projected light field 20 is reflected off of windshield 22 such that the illuminated image is visible to a driver of the vehicle as a virtual image 26.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
    a body that is at least partially transparent and that has a plurality of outer surfaces; and
    an image source configured to emit an illuminated image into a transparent portion of the body such that the illuminated image is internally reflected off the outer surfaces a plurality of times within the transparent portion of the body before leaving the body and then being reflected off of a windshield of the vehicle such that the illuminated image is visible to a driver of the vehicle and appears to the driver as a virtual image disposed outside the windshield and visible through the windshield, and wherein the virtual image measures 10°×4° as seen by the driver.

2. The head up display arrangement of claim 1 wherein the body is substantially wedge-shaped.

3. The head up display arrangement of claim 2 wherein the image source is configured to emit the illuminated image into a base of the substantially wedge-shaped body.

4. The head up display arrangement of claim 1 wherein the image source comprises a projector.

5. The head up display arrangement of claim 4 wherein the projector comprises a display screen.

6. The head up display arrangement of claim 1 wherein the virtual image is approximately between six and eight meters from the driver.

7. The head up display arrangement of claim 1 wherein at least one reflecting one of the outer surfaces of the body is nonplanar.

8. A head up display method for a motor vehicle, the method comprising:
    providing a body that is at least partially transparent and that has a plurality of outer surfaces;
    emitting an illuminated image into a transparent portion of the body;
    internally reflecting the illuminated image off of the outer surfaces a plurality of times within the transparent portion of the body before the illuminated image leaves the body; and
    reflecting the illuminated image off of a windshield of the vehicle after the illuminated image has left the body, the illuminated image being reflected off of the windshield such that the illuminated image is visible to a driver of the vehicle and appears to the driver as a virtual image disposed outside the windshield and visible through the windshield, and wherein the virtual image measures 10°×4° as seen by the driver.

9. The head up display method of claim 8 wherein the body is substantially wedge-shaped.

10. The head up display method of claim 9 wherein the illuminated image is emitted into a base of the substantially wedge-shaped body.

11. The head up display method of claim 8 wherein the virtual image is approximately between six and eight meters from the driver.

12. A head up display arrangement for a motor vehicle, the arrangement comprising:
- a transparent wedge-shaped body including a base and two non-parallel internally reflective surfaces, each of the reflective surfaces including a respective first end and a respective second end opposite to the first end, each of the reflective surfaces having a substantially equal length between the respective first end and the respective second end, the base interconnecting the first ends of the reflective surfaces, the first ends being farther apart from each other than are the second ends;
- an image source configured to emit an illuminated image into the base of the body such that the illuminated image is alternatingly reflected off the two internally reflective surfaces a plurality of times within the body before leaving the body; and
- a windshield reflecting the illuminated image after the illuminated image has left the body, the windshield reflecting the illuminated image such that the illuminated image is visible to a driver of the vehicle and appears to the driver as a virtual image disposed outside the windshield and visible through the windshield, and wherein the virtual image measures 10°×4° as seen by the driver.

13. The head up display arrangement of claim 12 wherein the image source comprises a projector.

14. The head up display arrangement of claim 13 wherein the projector comprises a display screen.

15. The head up display arrangement of claim 12 wherein the virtual image is approximately between six and eight meters from the driver.

\* \* \* \* \*